(12) United States Patent
Acernese et al.

(10) Patent No.: US 6,395,168 B1
(45) Date of Patent: May 28, 2002

(54) RETICULATED LIQUID TREATMENT DEVICE

(75) Inventors: Primo L. Acernese, Allentown, PA (US); Thomas Lotts, Austin, TX (US)

(73) Assignee: Terra Group, Corp., Allentown, PA (US)

( * ) Notice: Subject to any disclaimer, the term of this patent is extended or adjusted under 35 U.S.C. 154(b) by 0 days.

(21) Appl. No.: 09/443,558

(22) Filed: Nov. 19, 1999

(51) Int. Cl.⁷ .................................................. C02F 1/50
(52) U.S. Cl. ..................... 210/198.1; 424/618; 424/630; 424/641
(58) Field of Search ................. 424/618, 630, 424/641; 210/198.1

(56) References Cited

U.S. PATENT DOCUMENTS

| | | | |
|---|---|---|---|
| 4,608,247 A | * | 8/1986 | Heinig, Jr. |
| 4,911,898 A | * | 3/1990 | Hagiwara et al. |
| 5,314,623 A | | 5/1994 | Heskett |
| 5,368,705 A | * | 11/1994 | Cassidy |
| 5,415,770 A | | 5/1995 | Heskett |
| 5,552,046 A | * | 9/1996 | Johnston et al. |
| 5,599,456 A | | 2/1997 | Fanning |
| 5,681,475 A | | 10/1997 | Lamensdorf et al. |
| 5,788,858 A | | 8/1998 | Acernese et al. |
| 5,944,973 A | * | 8/1999 | Hall |
| 5,961,843 A | * | 10/1999 | Hayakawa et al. |
| 6,126,931 A | * | 10/2000 | Sawan et al. |

OTHER PUBLICATIONS

Capt. Brian Balough, Quartermaster Units Test Water Purification Systems Potential, *The Frontline*, Jun. 24, 1999, section 7A.

*Environmental Times*, vol. 4, Issue 1, Apr. 1999.

\* cited by examiner

*Primary Examiner*—Betsey Morrison Hoey
(74) *Attorney, Agent, or Firm*—Duane Morris LLP

(57) ABSTRACT

Devices and methods for treating liquids are disclosed. The devices comprise at least three metals, one of which is silver, preferably in the form of an alloy. The metals have a reticulated structure, which provides porosity or surface-to-volume ratio suitable for treatment of liquids. The devices can be used in combination with other treatment devices and methods.

23 Claims, 2 Drawing Sheets

RETICULATED LIQUID TREATMENT DEVICE

The present invention is related to reticulated devices for treating liquids, and methods for using the devices to treat liquids. The water treatment devices comprise reticulated structures formed from at least three metals.

BACKGROUND

Purified water is needed for drinking, bathing, cooking, and general household, industrial, military and medical applications. Purification can include removing or reducing the content in water of undesired biological and/or chemical entities, or neutralizing or counteracting the activity or harmful effects of such entities.

Methods of purification include chemical treatment, such as treatment with chlorine, filtration, reverse osmosis, activated carbon, and ion exchange.

Chemical treatments include the use of compounds containing chlorine. Chlorine is useful in controlling bacteria and is often used in the form of hypochlorous acid or calcium hypochlorite. However, discharge of chlorinated water can cause environmental damage and can damage purification elements such as reverse osmosis filters. Other chemical compounds that have been used for treatment of water, particularly for removal of organic compounds, include potassium permanganate and sodium hydroxide.

Reverse osmosis generally uses a filtration membrane, which allows a liquid such as water to pass through while partially or completely retaining species such as salts. Flow across the membrane is driven by a chemical potential gradient. Membranes used in osmosis can have a chemical charge, imparted by the presence of functional groups such as carboxylic or sulfonic groups on the membrane. Charged membranes that can allow relatively high liquid flux and can remove compounds such as organic materials and color agents are used in modern filtration techniques known as nanofiltration.

Precipitants and coagulants are also known for use in water treatment and purification, and can be used in combination with other agents, as in the water purification composition disclosed in U.S. Pat. No. 5,681,475, the disclosures of which are hereby incorporated herein by reference in their entirety. U.S. Pat. No. 5,681,475 discloses a composition provided in unit-dosage form, that includes a disinfectant-sanitizer; a coagulant precipitant; a dispersion-buffer agent; a primary colloidal flocculant; a secondary colloidal flocculant; an agglomeration matrix and pre-filter; and a bulk ion exchange absorbent.

It is often desirable or necessary to remove heavy metals from a water supply. Metals that enter the water supply from wastewater include copper, chromium, zinc, cadmium, mercury, lead and nickel. Metals can often be removed by chemical precipitation as carbonates, hydroxides or sulfides, or by activated carbon, reverse osmosis or ion exchange.

Recently, metal particulates have been used for water treatment. Typical metals used in particulate form for water purification include zinc and copper, which are useful for treating water containing chlorine and bacteria. U.S. Pat. No. 5,314,623, the disclosures of which are hereby incorporated herein by reference in their entirety, discloses a method for treating fluids that utilizes a bed of metal particles such as aluminum, steel, zinc, tin, copper, and mixtures and alloys thereof. Preferred metals are zinc and copper, which can be combined in the form of an alloy such as brass. While U.S. Pat. No. 5,314,623 discloses that the term "brass" can include copper-zinc alloys which can contain other constituents, such as an alloy of 57% copper/ 40% zinc and 3% lead, the patent further teaches that silver is not desirable because it is difficult to achieve effective bacteriostatic concentrations and keep within the EPA established guidelines for dissolved silver content, and that the cost of silver can be prohibitive.

A need remains for new and effective treatment methods and devices for water and other liquids, particularly for methods and devices that can effectively remove bacteria. The present invention is directed toward these and other important ends.

SUMMARY OF THE INVENTION

According to one aspect of the invention, there is provided a device for treating liquids. The device includes a reticulated structure formed from at least three metals, one of which metals is silver. The metals are preferably in the form of an alloy.

Another aspect of the invention is a device for treating liquids, including a substrate having a reticulated structure, and a laminate of at least three metals disposed upon the substrate. In some embodiments, the substrate is made of a non-metallic material.

In preferred embodiments, the amount of silver present in the laminates and the reticulated structures of the devices of the invention is at least about 0.5 weight percent, based on the total weight of the metals. Also in preferred embodiments, the laminate or reticulated structure includes copper, zinc and silver. In some embodiments of the invention, the amount of silver is at least about 8 weight percent, the amount of zinc is at least about 25 weight percent, and the amount of copper is at least about 40 weight percent, based on the total weight of the metals. In certain highly preferred embodiments, the metals include from about 40 weight percent to about 60 weight percent copper, from about 25 weight percent to about 45 weight percent zinc, and from about 0.5 weight percent to about 25 weight percent silver.

Another aspect of the present invention is a method for treating a liquid that includes passing the liquid through a device including a reticulated structure preferably formed from at least three metals or metal oxides, one of which is silver. In preferred embodiments, two of the metals or metal oxides are selected from the group consisting of copper, platinum, magnesium, aluminum, activated alumina, zinc, tin, titanium and palladium.

A further aspect of the invention is a method of manufacturing a liquid treatment device. The method includes providing a substrate having a reticulated structure, and depositing onto the substrate a laminate comprising at least three metals. The laminate and substrate can be heated so that the substrate at least partially decomposes, forming a reticulated structure comprising the at least three metals.

These and other aspects of the present invention will be apparent to one skilled in the art in view of the following disclosure and the appended claims.

DETAILED DESCRIPTION

Figure 1:
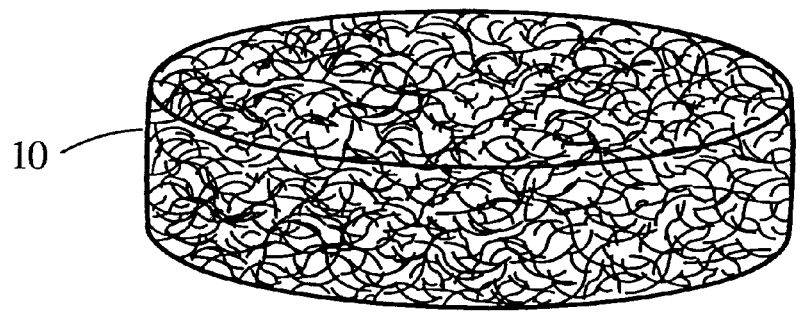
FIG. 1 shows a preferred reticulated metal structure.

The present inventor has surprisingly and unexpectedly discovered that the combination of three or more metals, in reticulated form, can provide effective methods and devices for the treatment of liquids. The methods and devices of the invention are applicable to any liquid, preferably aqueous liquids, and especially water. The metals used in the devices and methods of the invention include silver and at least two other metals. In some embodiments, a metal oxide can be used in place of one of the three or more metals.

The term "treatment", as used herein to refer to the use of the devices and methods of the present invention, means the contacting of a liquid with a device in order to reduce, remove, inactivate, neutralize, react, kill or otherwise ameliorate undesired chemical and/or biological entities in the liquid. Treatment can therefore include purification; however it is to be understood that treatment does not necessarily mean total removal of all chemical and/or biological entities, and therefore, results other than such total removal are within the scope of the present invention clarification.

The devices of the present invention preferably include at least three metals, one of which is silver. Silver is desirable in the devices of the present invention because of its known bactericidal properties. Contrary to conventional understanding, the inventor has found that silver is effective when used as a bactericide in the methods and devices of the present invention in relatively low quantities, i.e. as low as 0.5 weight percent or lower, based on the total weight of the metal laminate that is integral to the invention. The bactericidal properties of silver are advantageous over the merely or predominantly bacteriostatic properties of materials such as conventional brass having a composition of, for example, 50% copper/50% zinc. The inclusion of the relatively small amounts of silver in the metal laminates of the devices of the invention has been found to provide adequate bactericidal properties to the laminates. The inventor has further found that when copper is combined with silver to make an alloy, according to the invention, liquid treatment devices containing the alloy provide unexpectedly advantageous combinations of the properties of both metals. For example, the bactericidal strength of silver allows it to be used in relatively small quantities to enhance the effectiveness of copper in treating water that contains bacteria.

A further advantageous property of silver is that it readily forms solid solutions, known as alloys, with a number of metals, including aluminum, gold, beryllium, bismuth, copper, cadmium, germanium, indium, lead, palladium, platinum, tin, thorium and zinc. Such solid solutions are well suited to forming a laminate such as is used in the devices and methods of the present invention. Also, while the use of silver-impregnated carbon is known for treatment of liquids containing bacteria, the devices of the present invention preferably do not contain carbon.

Silver-copper water purification systems are known for use in swimming pools and for maintaining a level of water quality in water that has been treated with chlorine. "Silver's Good as Gold", Water Technology, August 1991, pp. 21–26. However, the inventor is aware of no known liquid treatment systems or devices that include a third metal, in addition to copper and silver, in an amount of about 20 percent by weight or greater. A water treatment device manufactured by Clearwater Enviro Technologies, Inc. includes electrodes containing 92% silver with the remaining 8% made of copper and zinc; however, the device requires an ionizer. In contrast, the devices of the present invention do not require an ionizer or any other ionizing means.

The metals used in the devices according to the invention preferably form a reticulated structure. By "reticulated structure", as used herein, is meant a structure resembling a network of fibers or having a mesh-like or sponge-like configuration. Reticulated structures made of brass are described in U.S. Pat. No. 5,788,858, the disclosure of which is hereby incorporated herein by reference in its entirety. Reticulated structures are desired, in part, because of their surface-to-volume ratio, porosity, and/or permeability. A preferred reticulated structure 10 is shown in FIG. 1. The reticulated structure can be, for example, in the form of a cylinder such as a cylindrical disk 20 shown in FIG. 2, or can be in other forms such as a cone, a sphere, or a parallelepiped.

Reticulated structures preferably have porosities of at least about 85 percent, more preferably at least about 90 percent, even more preferably at least about 95 percent, and still more preferably at least about 97 percent. "Porosity" refers to void volume, i.e. empty volume, within the structure. Pore sizes are preferably at least about 1 micron in diameter, more preferably at least about 2 microns, still more preferably at least about 3 microns, even more preferably at least about 4 microns, and still even more preferably at least about 5 microns. Also preferably, the pore diameters are about 500 microns or less, more preferably about 450 microns or less, still more preferably about 400 microns or less, even more preferably about 350 microns or less, and still even more preferably about 300 microns or less. The term "diameter" as used herein is not intended to imply that pores are necessarily spherical or cylindrical, but rather "diameter" is used to conveniently refer to the largest dimension in a single pore. Reticulated structures having pores of highly irregular shapes are within the scope of the invention.

Figure 2:
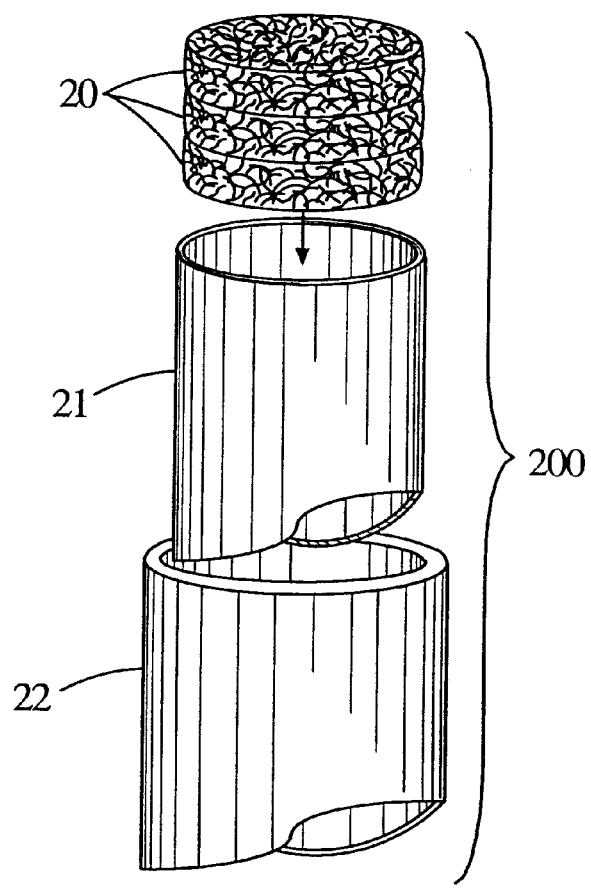
FIG. 2 shows three disks formed from a reticulated metal structure, to be placed inside a cartridge.
Figure 3:
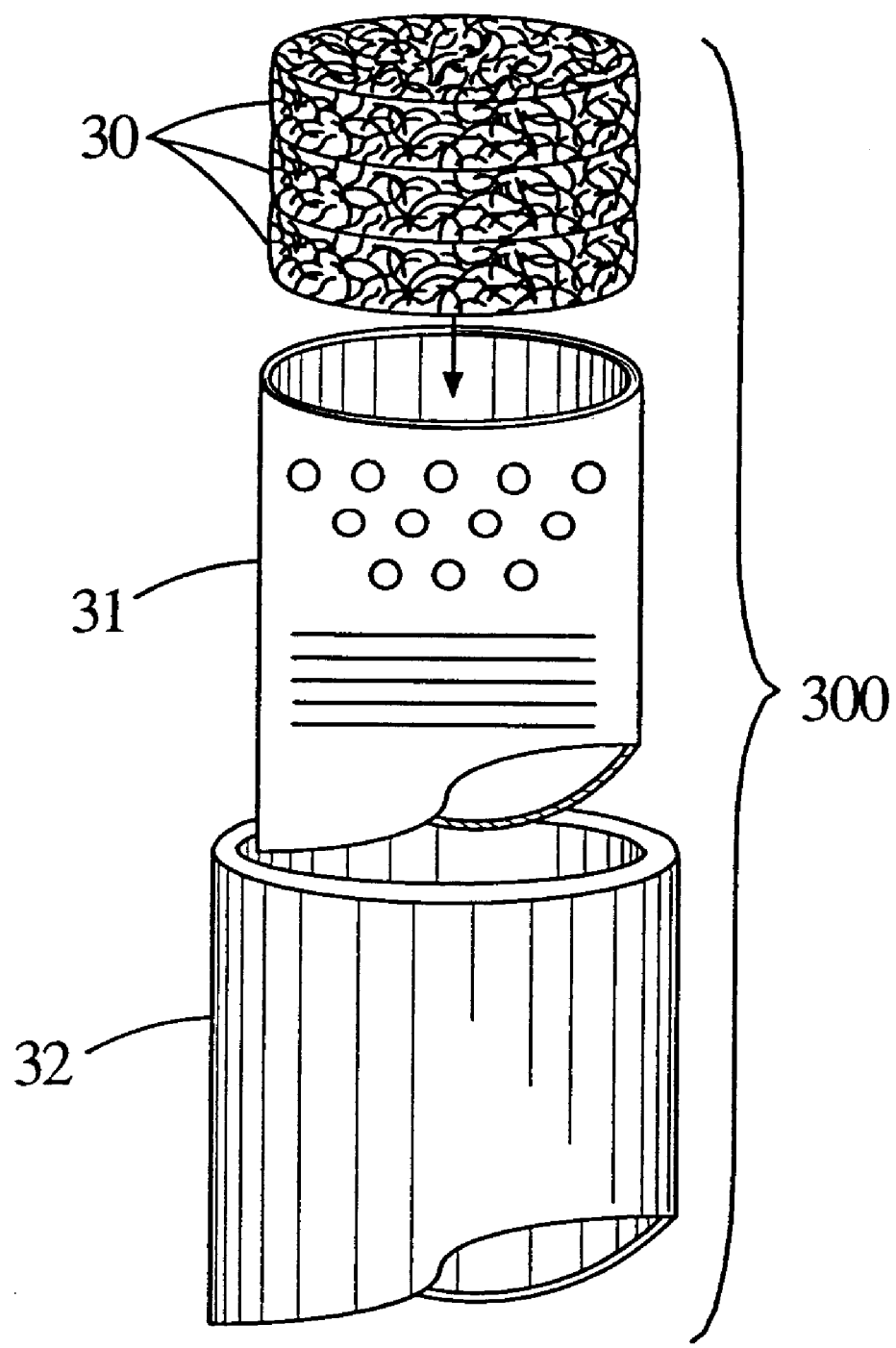
FIG. 3 shows three disks formed from a reticulated metal structure, to be placed inside a perforated cartridge.

An exemplary suitable reticulated structure 10 is shown in FIG. 1. Two or more such reticulated structures, also referred to as "elements", can be used in series. In some preferred embodiments, when the reticulated structure is in the form of a disk, 3, 4, 5 or more disks are arranged in series. An exemplary element 200 is shown in FIG. 2. The element includes disks 20 within a cartridge 21, and the cartridge can be placed inside a tube 22 as shown in FIG. 2 and described in U.S. Pat. No. 5,788,858. Preferably, when the reticulated structure is in the form of a disk 20, the disk is cylindrical and has a diameter of at least about 3 inches, more preferably at least about 4 inches. In some embodiments, the disks 20 can have diameters of about 5 or 6 inches or more. Also preferably, the thickness of the disk along the direction of the axis of the cylindrical disk 20 is at least about 0.5 inch, more preferably at least about 1 inch, and even more preferably at least about 2 inches. Generally, the maximum thickness is determined by the level of chemical and/or biological entities to be removed from the liquid, and can be readily determined by one skilled in the art. In some embodiments, as shown in FIG. 3, disks 30 are placed inside a perforated cartridge 31, which can be placed inside a tube 32, forming element 300.

A reticulated structure can be formed from metal particles bound together, such as the foam-like structures shown in U.S. Pat. No. 5,599,456, the disclosures of which are hereby incorporated herein by reference in their entirety. Other methods for forming a reticulated structure include melting followed by melt extraction. In an exemplary technique, a molten alloy of three of more metals is extracted, cooled, and solidified into fibers. The fibers are preferably relatively flat, i.e. having a structure similar to that of a ribbon or tape. The fibers preferably have thicknesses of at least about 15 microns, more preferably at least about 20 microns, still more preferably at least about 25 microns, and even more preferably at least about 30 microns. Also preferably, the fibers are about 3000 microns thick or less, more preferably about 2000 microns thick or less, still more preferably about 1500 microns thick or less, and even more preferably about 1000 microns thick or less. The thicknesses recited herein refer to the thickest part of a fiber. While flat, ribbon-like fibers are preferred, fibers having other structures, including cylindrical or highly irregular shapes, are within the scope of the invention. The fibers preferably are at least about 0.5 millimeter long, more preferably at least about 1 millimeter long, still more preferably at least about 1.5 millimeter long, and even more preferably at least about 2 millimeters long. Also preferably, the fibers are up to about 100 millimeters, more preferably up to about 75 millimeters, and still more preferably up to about 50 millimeters long. Alternatively, metal substrates can be formed by vacuum compression of metal particles.

In preferred embodiments, the reticulated structures are formed from laminates of the metals. Laminates can be formed by depositing three or more metals onto a substrate having the above-described reticulated structure. Metals can be deposited onto a substrate, for example, by electrodeposition, chemical vapor deposition, physical vapor deposition (sputtering), high energy ion bombardment, plasma implant processes, dip coating, and metallurgical processes known to those skilled in the art.

The substrate can be made of any material to which the desired metals for a device can be adhered. Non-metal substrates should be of a material that can be "burned off", i.e., decomposed, upon heating to a temperature that is below the melting point of the metal or metals, preferably at temperatures used in forming a laminate on the substrate. Exemplary materials suitable as substrates for forming the laminates include polymeric materials such as plastics, ceramic materials, wood, carbon, and composite materials. Exemplary composite materials include ceramics and cermets and can comprise one or more compounds such as silica, alumina, and titania. Exemplary plastic and polymeric materials include polyethylene, polypropylene, polystyrene, polycarbonate, polyurethane, copolymers of acrylic and non-acrylic polymers, and blends thereof. Any plastic, polymeric or composite material that can provide a suitable reticulated structure having desired properties of porosity, rigidity and pore size is useful. Plastic and polymeric materials can contain additives and processing aids known to those skilled in the art. Plastic and polymeric materials may contain additives that enhance their physical properties and/or facilitate deposition of a metallic coating thereon.

Following deposition of the metals, if deposition has been accomplished by a method that does not utilize sufficient heat to decompose the substrate, the metals and substrate are heated to a temperature and for a time sufficient to at least partially decompose the substrate, preferably to substantially vaporize the substrate, including any additives and processing aids contained in the substrate. The required temperature and time depend upon the composition of the substrate, and can be determined by one of skill in the art. As an example, for a polyethylene substrate, a temperature of about 1000 to 2000 degrees F. is generally adequate.

In some embodiments, the substrate can be metal and can be in forms such as, for example, meshes or wires. Metal substrates will generally not be decomposed, but will remain an integral part of the reticulated structure. Particles of individual metals and/or metal alloys can be deposited onto a metal form of, for example, copper. Following deposition of the metal or alloy onto the metal substrate, the coated substrate can be annealed, and, if desired, can be further treated. Further treatments can include, for example, high energy ion bombardment, chemical vapor deposition or physical vapor deposition.

In contrast to devices such as those disclosed in U.S. Pat. No. 5,314,623, already incorporated herein by reference, the devices of the present invention include silver. Also, the devices of the present invention include three or more metals, and can include metals other than copper and zinc, in levels higher than those disclosed in U.S. Pat. No. 5,314,623. The amounts and ratios of the metals can vary, depending upon factors such as the intended use of the liquid being treated, and the entities known or expected to be present in the liquid. For example, silver is preferred for ameliorating bacterial contamination, while copper may be preferred when treatment is directed primarily toward ameliorating algae. As a general guideline, the amount of silver present is preferably at least about 0.5 weight percent and can be, for example, about 0.7, 0.8, 0.9, 1, 2, 3, 4, 5, 6, 8 or 10 weight percent. All percentages of metals in the laminate refer to weight percent, based on the total weight of all metals in the laminate. Advantageously, the amount of silver is at least about 2 weight percent, preferably at least about 8 weight percent more preferably at least about 9 weight percent, and still more preferably at least about 10 weight percent. Generally, it is preferred that the amount of silver be about 30 weight percent or less, more preferably about 25 weight percent or less, and even more preferably about 20 weight percent or less.

At least two metals other than silver are included in the laminate. The other metals are preferably selected from gold, germanium, indium, palladium, platinum, tin, thorium and zinc. Preferably, one of the other metals is copper. Copper is desired for, among other properties, its effectiveness is treating liquids containing undesired amounts of algae. The amount of copper can vary but is preferably at least about 30 weight percent, more preferably a least about 35 weight percent, even more preferably at least about 40 weight percent, still more preferably at least about 45 weight percent, and in highly preferred embodiments, about 50 weight percent. Preferably, the amount of copper is about 70 weight percent or less, more preferably about 65 weight percent or less, still more preferably about 60 weight percent or less.

Devices according to the invention include, in addition to silver and a second metal, at least a third metal. In some embodiments, the devices can include a fourth, fifth, sixth, seventh and even eighth metal. However, devices including three, four or five metals are preferred, and devices including three or four metals are more preferred. Devices including a first, second and third metal are highly preferred. As used herein to describe metals useful in devices according to the invention, the term "third" is intended to include third, fourth, fifth, etc., i.e. any metals in addition to silver and copper.

The third metal can be any metal that forms an alloy with silver and the second metal, especially with silver and copper, and is preferably selected from gold, germanium, indium, palladium, platinum, tin, thorium and zinc. The amount of the third metal present is generally determined by the amounts of silver and copper present, which in turn, as mentioned above, are determined in part by the undesired biological and/or chemical entities known to be present in the liquid. More preferred metals are magnesium, aluminum and zinc. Zinc is highly preferred. When the third metal is zinc, generally the laminate includes at least about 20 weight percent zinc, preferably at least about 25 weight percent, more preferably at least about 30 weight percent, even more preferably at least about 30 weight percent, and still more preferably at least about 40 weight percent. The amount of zinc is generally about 50 weight percent or less, preferably about 45 weight percent or less. In one highly preferred embodiment of the invention, the laminate includes about 50 weight percent copper, about 40 weight percent zinc, and about 10 weight percent silver. In another highly preferred embodiment, the laminate includes about 50 weight percent copper, about 30 weight percent zinc and about 20 weight percent silver. The weights recited refer to the amounts of each metal in the laminate after heating. It is to be understood that when certain metals are heated above their sublimation temperature, some loss can occur and, as will be recognized by one skilled in the art, the loss should be considered when determining the quantity of metal to be applied in forming the laminate.

Other metals can be used with silver, preferably in combination with copper, in addition to or in place of zinc. For example, other metals useful in forming the laminates of the devices of the present invention include titanium and magnesium. However, it should be noted that magnesium is more volatile than silver and copper so that the amount of magnesium present in the laminate can be lower then the amount initially applied to a substrate. The amount of magnesium that is lost due to sublimation is generally less than about 10 weight percent, frequently less than about 5 weight percent, and can be minimized by avoiding heating the metals to an unnecessarily high temperature. Aluminum is also suitable for inclusion in the laminate, although its cost may be higher than that of other suitable metals. If desired, silicon can be included in the laminate. Although silicon is generally classified as a semiconductor, the term "metal" as used herein is intended to include silicon when used to refer to the laminate. Activated alumina can also be used in forming the laminate, and the term "metal" as used herein is intended to include activated alumina when used to refer to the laminate.

The devices and methods of the present invention can be used to treat any liquid, preferably an aqueous liquid, especially water. Preferably, for treatment using the devices and methods of the present invention, a liquid has an ionic impurity concentration of less than about 2000 mg/L, more preferably less than about 1500 mg/L. If necessary, prior to treatment using the devices and methods of the present invention, the ionic impurity concentration of a liquid can be reduced using conventional methods known to those skilled in the art.

The devices and methods of the present invention can be used in combination with other purification techniques, such as reverse osmosis. Preferably, a liquid purified by a device of the present invention is subjected to further purification, such as reverse osmosis, after having been contacted with the inventive device. It has been discovered that the use of the devices of the present invention to treat a liquid prior to subjecting the liquid to reverse osmosis reduces biological contamination of membranes used in subsequent filtration or reverse osmosis. The metal reticulated structure of the devices of the invention also reduces or removes chlorine present in chlorine-treated or contaminated water, reducing damage to membranes used in filtration or reverse osmosis. In addition to or in place of subsequent treatment, a liquid can be treated using one or more conventional treatment methods prior to subjecting the liquid to treatment using the devices and methods of the present invention. For example, the liquid may first be treated with a device such as the devices disclosed in U.S. Pat. No. 5,314,623, already incorporated herein by reference.

In some situations, it is desirable that water purification devices be transportable. For example, military forces require potable water in the field, and for any substantial deployment of troops, it is convenient to provide water treatment facilities, usually mobile units carried by trucks or on trailers, which purify water that is then chlorinated and stored in large bladders from which the water is dispensed for use. A standard form of water treatment unit used by the U.S. military is known as a "Reverse Osmosis Water Purification Unit", or by the acronym "ROWPU". A ROWPU is described in U.S. Pat. No. 5,788,858, the disclosures of which are hereby incorporated herein by reference in their entirety.

The present invention is further described in the following Examples. The examples are merely illustrative of the present invention and should not be construed as limiting the scope of the invention in any way.

EXAMPLES

Example 1

Metal fibers are formed by melt extraction of 5 weight percent silver, 50 weight percent copper, 30 weight percent zinc and 15 weight percent magnesium. The fibers have a thickness of from about 30 micrometers to about 1000 micrometers and lengths from about 2 millimeters to about 50 millimeters. The fibers are formed into disks by sintering. The disks have a porosity of up to about 97%, and pore sizes ranging from about 5 micrometers to about 300 microns in diameter.

Example 2

Metal fibers are formed by melt extraction of 5 weight percent silver, 45 weight percent copper, 25 weight percent zinc, 15 weight percent magnesium, and 5 weight percent aluminum. The fibers have a thickness of from about 30 micrometers to about 1000 micrometers and lengths from about 2 millimeters to about 50 millimeters. The fibers are formed into disks by sintering. The disks have a porosity of up to about 97%, with pore sizes from about 5 micrometers to about 300 microns in diameter.

Example 3

Metal fibers are formed by melt extraction of 7 weight percent silver, 43 weight percent copper, 30 weight percent zinc, 12 weight percent magnesium and 8 weight percent aluminum. The fibers have a thickness of from about 30 micrometers to about 1000 micrometers and lengths from about 2 millimeters to about 50 millimeters. The fibers are formed into disks by sintering. The disks have a porosity of up to about 97%, with pore sizes from about 5 micrometers to about 300 microns in diameter.

Example 4

Particles of metals are adhered to a copper mesh form. The composition of the particles is as follows: 8 weight percent silver, 42 weight percent copper, 12 weight percent zinc, 30 weight percent magnesium and 8 weight percent aluminum. The form having the particles thereon is placed into a furnace for annealing.

Example 5

A molten alloy of 7 weight percent silver, 43 weight percent copper, 40 weight percent zinc, 5 weight percent magnesium and 5 weight percent aluminum is formed in a crucible. An alumina/silica/titania disk is dipped into the molten alloy, removed and cooled. The disk is then diffusion annealed in an oven having an inert atmosphere.

Example 6

Disks are formed by compression under vacuum of metal particles. The composition of the metal particles is: 5 weight percent silver, 45 weight percent copper, 15 weight percent zinc, 30 weight percent magnesium, and 5 weight percent aluminum.

Example 7

Using chemical vapor deposition, the following metals are deposited onto disks formed according to Example 6: 9 weight percent silver, 50 weight percent copper, 23 weight percent zinc, 5 weight percent magnesium and 13 weight percent aluminum.

Example 8

Onto a plastic foam structure, the following metals are deposited by physical vapor deposition: 10 weight percent silver, 40 weight percent copper, 10 weight percent zinc, 35 weight percent magnesium, and 5 weight percent aluminum.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A device for treating liquids, consisting essentially of at least three metals, one of said metals being silver, said metals having a reticulated structure, wherein said metals are in the form of an alloy.

2. The device of claim 1, further comprising a substrate having said reticulated structure, wherein said metals are disposed upon said substrate.

3. The device of claim 2 wherein said substrate comprises a non-metallic material.

4. The device of claim 3 wherein said substrate comprises a material selected from the group consisting of ceramics, polymers, and composite materials.

5. The device of claim 2, wherein said substrate comprises a metal.

6. The device of claim 1 wherein at least two of said metals are selected from the group consisting of copper, platinum, magnesium, aluminum, activated alumina, zinc, tin, titanium and palladium.

7. The device of claim 1 wherein said metals comprise copper, zinc and silver.

8. The device of claim 7, comprising at least about 20 weight percent zinc.

9. The device of claim 7, comprising at least about 30 weight percent zinc.

10. The device of claim 7, comprising at least about 35 weight percent zinc.

11. The device of claim 7, comprising up to about 45 weight percent zinc.

12. The device of claim 7, comprising at least about 35 weight percent copper.

13. The device of claim 7, comprising up to about 60 weight percent copper.

14. The device of claim 7 comprising from about 40 weight percent to about 60 weight percent copper, from about 25 weight percent to about 45 weight percent zinc, and from about 0.5 weight percent to about 25 weight percent silver.

15. The device of claim 1, comprising at least about 0.5 weight percent silver.

16. The device of claim 1, comprising at least about 8 weight percent silver.

17. The device of claim 1, comprising up to about 30 weight percent silver.

18. The device of claim 1, wherein said reticulated structure comprises a porosity of at least about 90 percent.

19. The device of claim 1, wherein said reticulated structure comprises a porosity of at least about 95 percent.

20. The device of claim 1, wherein said reticulated structure comprises pores having diameters of at least about 5 microns.

21. The device of claim 1, wherein said reticulated structure comprises pores having diameters up to about 300 microns.

22. The device of claim 1, comprising up to about 25 weight percent silver.

23. The device of claim 1, comprising up to about 20 weight percent silver.

* * * * *